United States Patent [19]

Visser

[11] Patent Number: 5,394,670

[45] Date of Patent: Mar. 7, 1995

[54] TRAY FILLER

[75] Inventor: Anthony Visser, 's-Gravendeel, Netherlands

[73] Assignee: Visser's-Gravendeel Holding B.V., Netherlands

[21] Appl. No.: 63,579

[22] Filed: May 19, 1993

[30] Foreign Application Priority Data

May 20, 1992 [NL] Netherlands ............... 9200892
Apr. 20, 1993 [NL] Netherlands ............... 9300669

[51] Int. Cl.⁶ ..................... B65B 1/04; A01G 9/08
[52] U.S. Cl. .............................. 53/249; 53/250; 53/475; 141/125
[58] Field of Search ............ 53/249, 250, 473, 475; 141/125, 35, 36, 132, 131

[56] References Cited

U.S. PATENT DOCUMENTS

| | | | |
|---|---|---|---|
| 3,213,587 | 10/1965 | Carruthers | 53/473 X |
| 3,298,404 | 1/1967 | Eisenberg | 53/473 X |
| 3,300,945 | 1/1967 | Grossi et al. | 53/473 X |
| 4,226,073 | 10/1980 | Rose et al. | 53/249 X |
| 4,434,602 | 3/1984 | Culpepper | 53/473 |

FOREIGN PATENT DOCUMENTS

| | | |
|---|---|---|
| 0251400 | 1/1988 | European Pat. Off. . |
| 2512324 | 3/1983 | France . |
| 2651090 | 3/1991 | France . |

Primary Examiner—James F. Coan
Attorney, Agent, or Firm—Evenson, McKeown, Edwards & Lenahan

[57] ABSTRACT

The invention relates to a device for filling with loose material carriers provided on their top with cavities, comprising: a transporting member for transporting the carriers; a scraper member arranged above the transporting member and drivable in rotation round a vertical shaft, which scraper member is arranged at a distance from the conveyor belt substantially corresponding with the height of the carriers for filling; and a ring enclosing the path described by the scraper member, wherein on the downstream located side of the ring means are arranged for removing excess loose material from the carriers; wherein on the upstream located side of the ring means are arranged for feeding loose material to the carriers; and wherein transporting means are arranged for transporting loose material coming from the first means to the second means. The first and second means and the transporting means are preferably formed by a second scraper element adapted to follow a path located outside the first ring, which path is closed off on the outside by a second ring and partly closed off on the underside by a bottom, wherein the second scraper element is rotatably drivable.

20 Claims, 2 Drawing Sheets

TRAY FILLER

BACKGROUND AND SUMMARY OF THE INVENTION

The present invention relates to a device for filling with loose material carriers provided on their top with cavities, comprising a transporting member for transporting the carriers; a first scraper member arranged above the transporting member and drivable in rotation round a vertical shaft, which first scraper member is arranged at a distance from the conveyor belt substantially corresponding with the height of the carriers for filling; and a first ring enclosing the path described by the first scraper member.

Such a device is known from the Netherlands patent application number 8902200.

This known device is very satisfactory for filling carriers in a correct manner, usually trays with loose material, mainly culture material in the form of soil, sand or other fibrous or non-fibrous materials suitable for making plants grow.

This known device is rather complicated however; in addition to the transporting member for the trays for transporting, this known device for instance comprises two conveyor belts for transporting the filler material which are each provided with their own drive, so that this known device is comparatively heavy, voluminous and expensive.

The object of the present invention is to provide a device also enabling a good filling of the carriers but the cost of which is considerably lower.

This object is achieved in that on the downstream located side of the first ring first means are arranged for removing excess loose material from the carriers; in that on the upstream located side of the first ring second means are arranged for feeding loose material to the carriers; and in that transporting means are arranged for transporting loose material from the first means to the second means.

As a result of these steps it is possible to obtain a good filling of the carriers using a machine of considerably smaller size and associated lower cost and decreased complexity.

The first means on the downstream located side can be formed by relatively simple means, for instance a fixedly disposed scraper knife or by another device, whereafter the transporting means ensure that the excess filler material is fed to the cavities of the carriers. Transporting means can also take a simple form, for instance a conveyor belt or the like. The second means can be formed by a construction of the conveyor belt such that the filler material coming therefrom is poured onto the carriers.

According to a second embodiment the first and the second means are each formed by a second scraper member adapted for executing a reciprocating movement substantially in the direction transversely of the direction of movement of the transporting means. This provides a good scraping action, while also resulting in a good distribution of the supplied loose material.

According to a third embodiment the first and second means and the second transporting means are formed by a second scraper member adapted to follow a path located outside the first ring, which path is closed off on the outside by a second ring and partly closed off at the underside by a bottom, wherein the second scraper member is rotatably drivable.

This third embodiment is particularly attractive; the construction thereof is very simple so that such a device can be manufactured at low production cost.

According to a fourth embodiment the ring is rotatably mounted, the first scraper member is fixedly connected to the ring and is the ring drivable.

This results in an exceptionally simple, reliable and inexpensive construction.

BRIEF DESCRIPTION OF THE DRAWINGS

The present invention will now be elucidated with reference to the annexed drawings, in which.

Figure 1:
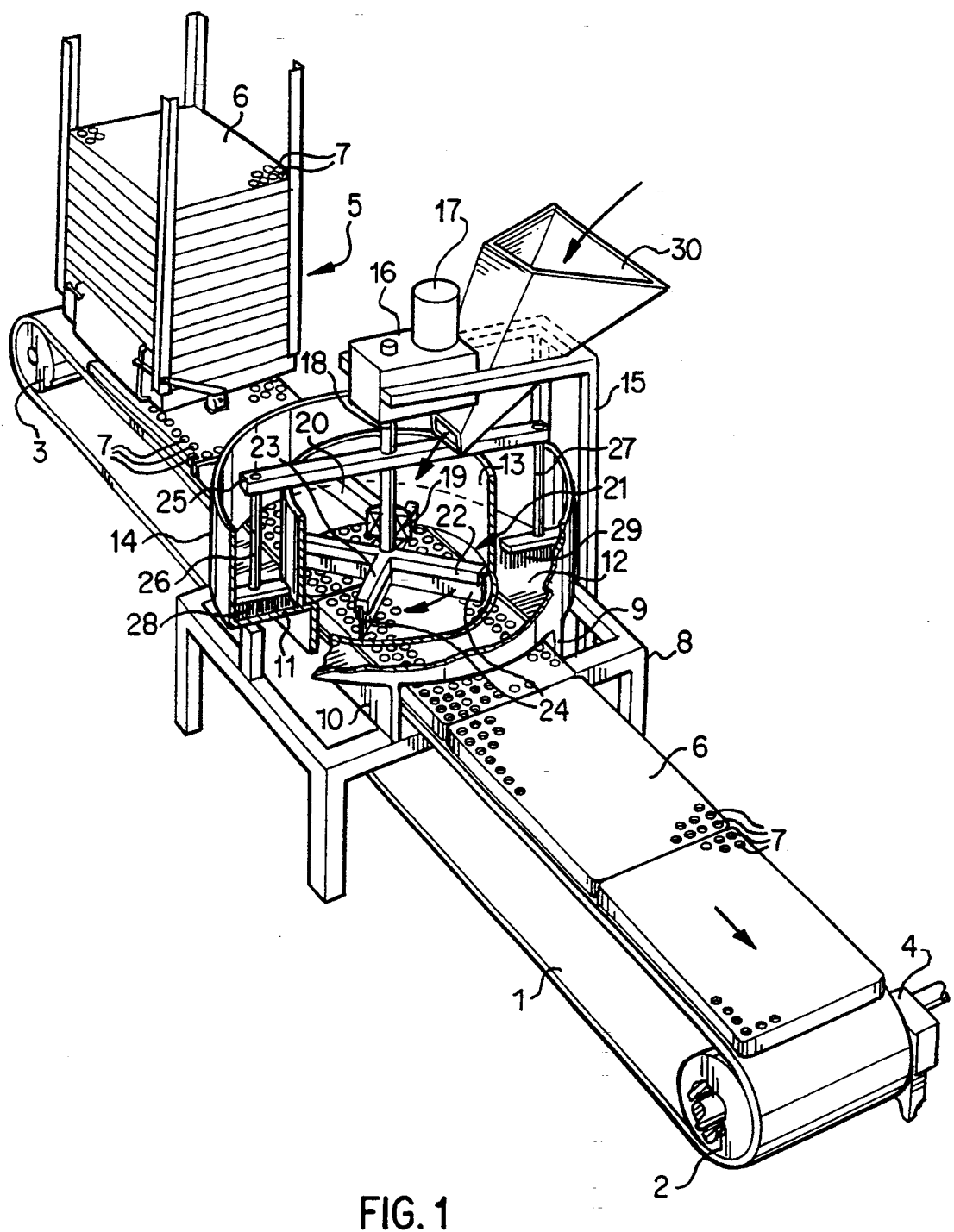
FIG. 1 shows a partly broken away perspective view of a first embodiment of the invention.

The device shown in FIG. 1 comprises a conveyor belt 1 trained about two drums 2, 3, whereof one drum 2 is driven by an electric motor 4. Arranged on one side of the conveyor belt is a de-stacking device 5 which is otherwise per se known and which will not be further described. The trays 6 coming from the de-stacking device are transported over conveyor belt 1. The trays 6 are provided on their upper part with cavities 7 which have to be filled with culture material. Arranged for the filling is a filling device which is formed by a frame 8 above which extends the upper part of conveyor belt 1. Fixed to the frame are two side wall 9 and 10 respectively between which the trays 6 for filling are guided. From the top of side walls 9, 10 extend plates 11 and 12 respectively, the upper part of which lies at the same height as the top of the trays for filling. Arranged on top of the plates is a cylinder 13 extending partly above the path of the trays for filling and partly above the plates 11, 12. Further arranged concentrically of cylinder 13 is a second cylinder 14 which also forms the outer edge of the plates 11, 12.

Further fixed to the frame is a sub-frame 15 in which is fixed a gearbox 16 which is connected to an electric motor 17. The gearbox is positioned such that an output shaft 18 thereof extends concentrically of cylinders 13, 14. The shaft 18 is otherwise mounted in an auxiliary bearing 19 connected by means of a rod 20 to the cylinder 13. On the underside of output shaft 18 is arranged a first scraper element 21 formed by two extending rods 22, 23 in the underside of which are fixed plates 24 made of resilient material. The dimensioning of these plates is such that they scrape over the top of trays 6.

Further arranged on the shaft is an auxiliary rod 25 on the ends of which secondary rods 26, 27 are attached, to each of which is fixed a brush 28 and 29 respectively.

Finally, a feed hopper 30 is arranged in the sub-frame.

The operation of this device will now be described.

The trays 6 coming from the de-stacking device 5 are fed through one by one over the conveyor belt 1 driven by electric motor 4 to below the filling device. Loose material for arranging in the cavities 7 is herein poured, for instance from sacks, by means of the feed hopper 30 into the space enclosed by the cylinder 13. The output shaft 18 is driven in rotation by means of the electric motor 17 and gearbox 16 so that the scraper element 21 will rotate and the plates 24 will slide the material present in the relevant space into the cavities 7 of the trays 6 moving slowly thereunder at that position.

Due to the scraping action of the cylinder 13 extending above the trays the greater part of the available soil will be held back; it is however necessary for excess material to be removed from the top of the trays after the relevant cylinder has passed over. This takes place by means of the rotating brushes 28 which likewise ensure transport over the top of the plates 11 to the still empty cavities in the carriers, wherein the greater part of this material will fall into the cavities. Any residue is carried back again over the top part of plate 12. A cycle is thus obtained wherein effective use is made of the filler material for use so that no filler material is wasted and a good filling of the trays to the correct level is obtained.

Although in the embodiment shown here the brushes 28, 29 are driven in the same direction as the scraper plates 24, it is of course possible to cause the brushes to rotate in the other direction; for this purpose the construction with a hollow shaft can for instance be applied. In such a construction the filling of the cavities could perhaps be even more uniform.

Figure 2:
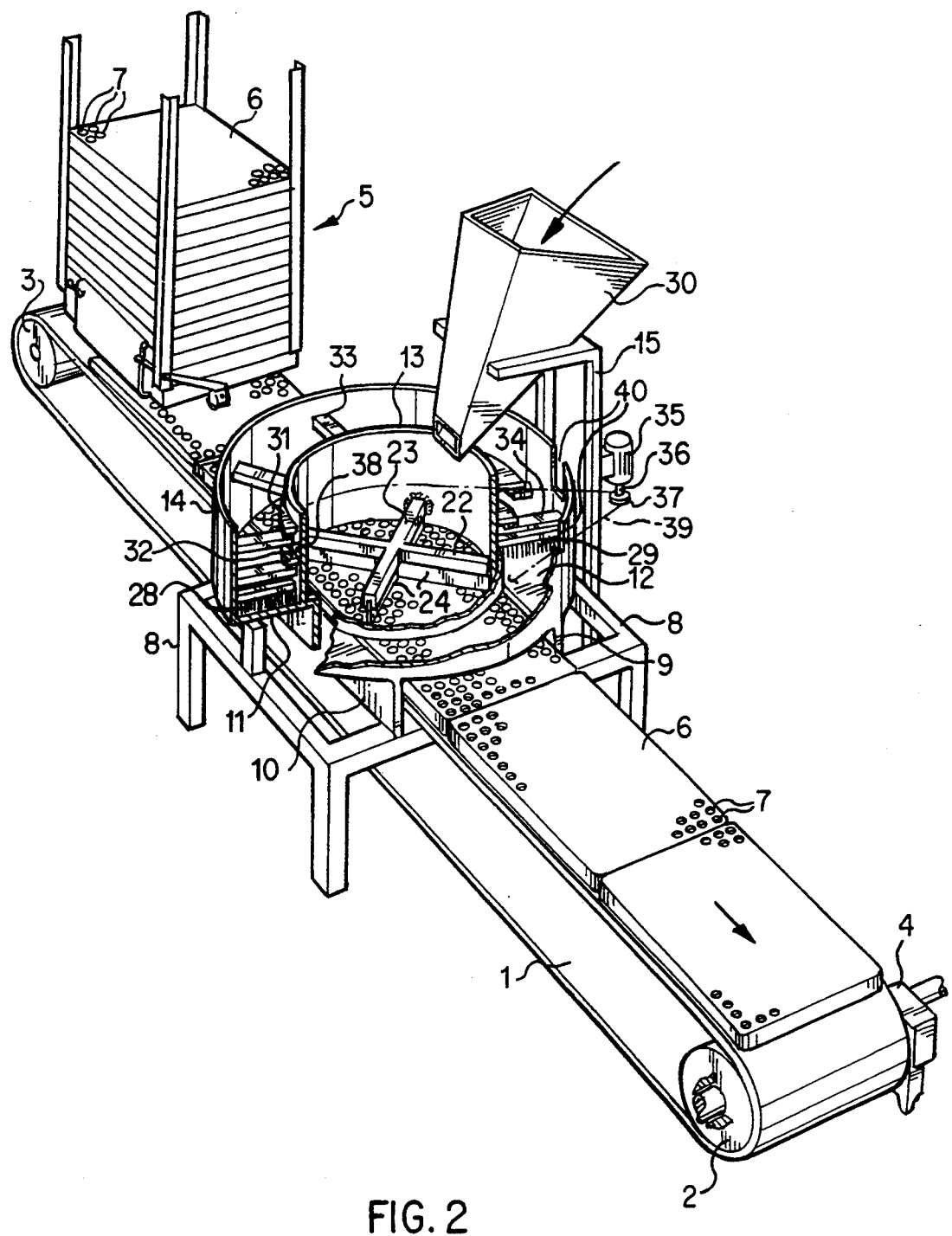
FIG. 2 shows a partly broken away perspective view of a second embodiment of the invention.

The embodiment depicted in FIG. 2 differs from the embodiment shown in FIG. 1 in that the first ring 13 is not disposed fixedly but is attached rotatably by means of annular bearings 31, 32. Bearings 31, 32 are each connected by means of connecting pieces 33 and 34 respectively to the second ring 14. The first inner ring 13 can thus rotate freely.

The first scraper member formed by the transversely extending rods 22, 23 to which the plates 24 manufactured from resilient material are fastened is fixedly attached in the interior of the first ring 13. When the first ring 13 rotates thus rotates the resilient blades 24 rotate with it. The same is true of the second scraper members formed by the respective brushes 28 and 29. These are likewise fixed to the first ring 13 so that they rotate with the ring.

For rotatably driving the first ring 13 use is made of an electric motor 35 which is fixed on the sub-frame 15 and on the output shaft 36 of which is arranged a pulley 37. Arranged on the outside of the drum is a guide 38 for guiding a belt 39 tensioned round the guide 38 and the pulley 37. Two recesses 40 are arranged in the second ring 14 to provide space for the belt 39.

In its mechanical construction this embodiment is thus considerably simpler than the first embodiment so that it can be manufactured at a lower cost price.

I claim:

1. Device for filling with loose material carriers provided on their top with cavities, comprising:
   a conveyor belt transporting member for transporting the carriers;
   a first scraper member arranged above the transporting member and drivable in rotation round a vertical shaft, which first scraper member is arranged at a distance from the conveyor belt substantially corresponding with a height of the carriers for filling; and
   a ring enclosing a path described by the first scraper member, and
   means for initially feeding said loose material into said ring,
   characterized in that
      on the downstream located side of the ring, first means are arranged for removing excess loose material from the carriers;
      on the upstream located side of the ring, second means are arranged for feeding said excess loose material to the carriers;
      and transporting means are arranged for transporting said excess loose material coming from the first means to the second means such that substantially all of said excess material is transported directly to said upstream side of the ring without being returned to said feeding means.

2. Device as claimed in claim 1, characterized in that the first and the second means are each formed by a second scraper member adapted for executing a reciprocating movement substantially in the direction transversely of the direction of movement of the transporting means.

3. Device as claimed in claim 1, characterized in that the first and second means and the transporting means are formed by a second scraper member adapted to follow a path located outside the first ring, which path is closed off on the outside by a second ring and partly closed off on the underside by a bottom, wherein the second scraper member is rotatably drivable.

4. Device as claimed in claim 2, characterized in that the first scraper member comprises at least a first scraper element formed by a blade manufactured from resilient material and that the second scraper member comprises at least a second scraper element formed by a brush.

5. Device as claimed in claim 1, characterized in that the ring is rotatably mounted, the first scraper member is fixedly connected to the ring and the ring is drivable.

6. Device as claimed in claim 5, characterized in that the ring is drivable by an electric motor via a pulley attached to the output shaft of the electric motor, a belt and a belt guide fixed in the ring.

7. Device as claimed in claim 3, characterized in that the paths of the first scraper member and of the second scraper member are concentric and that both scraper members are connected to the first ring and driven by the same motor.

8. Device as claimed in claim 1, characterized in that a feed hopper is arranged above the path of the first scraper member.

9. Device as claimed in claim 2, characterized in that the first and second means and the transporting means are formed by a second scraper member adapted to follow a path located outside the first ring, which path is closed off on the outside by a second ring and partly closed off on the underside by a bottom, wherein the second scraper member is rotatably drivable.

10. Device as claimed in claim 3, characterized in that the first scraper member comprises at least a first scraper element formed by a blade manufactured from resilient material and that the second scraper member comprises at least a second scraper element formed by a brush.

11. Device as claimed in claim 2, characterized in that the ring is rotatably mounted, the first scraper member is fixedly connected to the ring and the ring is drivable.

12. Device as claimed in claim 3, characterized in that the ring is rotatably mounted, the first scraper member is fixedly connected to the ring and the ring is drivable.

13. Device as claimed in claim 4, characterized in that the ring is rotatably mounted, the first scraper member is fixedly connected to the ring and the ring is drivable.

14. Device as claimed in claim 4, characterized in that the paths of the first scraper member and of the second scraper member are concentric and that both scraper members are connected to the first ring and driven by the same motor.

15. Device as claimed in claim 5, characterized in that the paths of the first scraper member and of the second scraper member are concentric and that both scraper members are connected to the first ring and driven by the same motor.

16. Device as claimed in claim 6, characterized in that the paths of the first scraper member and of the second scraper member are concentric and that both scraper members are connected to the first ring and driven by the same motor.

17. Device as claimed in claim 2, characterized in that a feed hopper is arranged above the path of the first scraper member.

18. Device as claimed in claim 3, characterized in that a feed hopper is arranged above the path of the first scraper member.

19. Device as claimed in claim 4, characterized in that a feed hopper is arranged above the path of the first scraper member.

20. Device as claimed in claim 5, characterized in that a feed hopper is arranged above the path of the first scraper member.

* * * * *